(12) United States Patent
Jackson et al.

(10) Patent No.: US 9,835,816 B2
(45) Date of Patent: Dec. 5, 2017

(54) FIBER BLOCKING KITS

(71) Applicant: Telect, Inc., Liberty Lake, WA (US)

(72) Inventors: Sean Jackson, Liberty Lake, WA (US); Steven W. Ellison, Mead, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/175,868

(22) Filed: Jun. 7, 2016

(65) Prior Publication Data

US 2016/0363734 A1    Dec. 15, 2016

Related U.S. Application Data

(60) Provisional application No. 62/173,800, filed on Jun. 10, 2015.

(51) Int. Cl.
*G02B 6/44* (2006.01)

(52) U.S. Cl.
CPC ......... *G02B 6/4494* (2013.01); *G02B 6/4471* (2013.01)

(58) Field of Classification Search
CPC ... G02B 6/4494; G02B 6/4459; G02B 6/4471
See application file for complete search history.

(56) References Cited

U.S. PATENT DOCUMENTS

| | | | | |
|---|---|---|---|---|
| 4,409,154 A * | 10/1983 | Grenat | ................. | B29C 47/027 264/1.28 |
| 4,993,800 A * | 2/1991 | Shibata | .................... | G02B 6/32 385/54 |
| 5,048,920 A * | 9/1991 | Newell | ................. | G02B 6/2804 385/55 |
| 5,113,475 A * | 5/1992 | Baker | .................. | G02B 6/4471 385/138 |
| 5,313,019 A * | 5/1994 | Brusselmans | ........... | C08L 53/02 174/77 R |
| 5,789,707 A * | 8/1998 | Damm | ................. | H02G 15/113 174/650 |
| 5,793,920 A * | 8/1998 | Wilkins | ............... | G02B 6/4446 385/135 |
| 6,104,855 A * | 8/2000 | Jeon | ..................... | G02B 6/3849 385/139 |
| 6,150,608 A * | 11/2000 | Wambeke | ............ | G02B 6/4428 16/2.1 |
| 6,152,767 A * | 11/2000 | Roosen | ................ | H02G 15/113 439/587 |
| 6,353,186 B1 * | 3/2002 | Dams | .................... | F16L 3/2235 16/2.1 |
| 6,608,254 B1 * | 8/2003 | Bernollin | ............. | G02B 6/4428 174/84 R |

(Continued)

OTHER PUBLICATIONS

"Ribbon Blocking Kit Installation Instructions", ADC Telecommunications, Inc.; ADCP-93-305 Issue 1, May 2004, 36 pages.

*Primary Examiner* — Peter Radkowski
(74) *Attorney, Agent, or Firm* — Lee & Hayes, PLLC

(57) ABSTRACT

Fiber blocking apparatuses couple to an outside fiber optic cable and include a damping unit that prevents damaging (e.g., micro-fracturing) optical fibers received from the outside fiber optic cable and blocks a gelatinous element from advancing out of the outside fiber optic cable. The fiber blocking apparatuses may include a view port providing visibility of a routing of the optical fibers in the fiber blocking apparatuses.

16 Claims, 4 Drawing Sheets

(56) References Cited

U.S. PATENT DOCUMENTS

| | | | | |
|---|---|---|---|---|
| 7,686,519 B2* | 3/2010 | Lu | G02B 6/3825 | 385/56 |
| 7,731,155 B2* | 6/2010 | Funamura | A61M 39/1011 | 251/149.6 |
| 8,401,353 B2* | 3/2013 | Barker | G02B 6/4471 | 385/105 |
| 8,891,923 B2* | 11/2014 | Parris | G02B 6/4494 | 156/166 |
| 8,899,841 B2* | 12/2014 | Cairns | G02B 6/4428 | 385/53 |
| 8,985,874 B2* | 3/2015 | Isenhour | G02B 6/42 | 385/88 |
| 9,057,862 B2* | 6/2015 | Strasser | G02B 6/4471 | |
| 9,182,564 B2* | 11/2015 | Strasser | G02B 6/4471 | |
| 9,182,566 B2* | 11/2015 | Parris | G02B 6/4494 | |
| 9,343,891 B2* | 5/2016 | Vanhentenrijk | G02B 6/4444 | |
| 9,383,521 B2* | 7/2016 | Dendas | G02B 6/4471 | |
| 9,548,601 B2* | 1/2017 | Strasser | G02B 6/4471 | |
| 2007/0145743 A1* | 6/2007 | Greenberger | F16L 37/092 | 285/322 |
| 2008/0138026 A1 | 6/2008 | Yow et al. | | |
| 2008/0183155 A1* | 7/2008 | Funamura | A61M 39/1011 | 604/533 |
| 2008/0310796 A1* | 12/2008 | Lu | G02B 6/3825 | 385/72 |
| 2010/0092135 A1* | 4/2010 | Barker | G02B 6/4471 | 385/76 |
| 2010/0166375 A1* | 7/2010 | Parris | G02B 6/443 | 385/113 |
| 2012/0014651 A1* | 1/2012 | Nad | G02B 6/4472 | 385/109 |
| 2013/0020771 A1* | 1/2013 | Vanhentenrijk | G02B 6/4444 | 277/605 |
| 2013/0146355 A1* | 6/2013 | Strasser | G02B 6/4471 | 174/72 A |
| 2013/0183003 A1* | 7/2013 | Cairns | G02B 6/4428 | 385/77 |
| 2013/0251315 A1* | 9/2013 | Isenhour | G02B 6/42 | 385/93 |
| 2014/0153876 A1* | 6/2014 | Dendas | G02B 6/4471 | 385/76 |
| 2014/0219621 A1* | 8/2014 | Barnette, Jr. | G02B 6/4439 | 385/135 |
| 2014/0304970 A1* | 10/2014 | Claessens | G02B 6/4444 | 29/428 |
| 2015/0055920 A1* | 2/2015 | Parris | G02B 6/443 | 385/109 |
| 2015/0055926 A1* | 2/2015 | Strasser | G02B 6/4471 | 385/135 |
| 2015/0093084 A1* | 4/2015 | Cooke | G02B 6/4471 | 385/113 |
| 2015/0234143 A1* | 8/2015 | Smith | G02B 6/4494 | 702/2 |
| 2016/0041356 A1* | 2/2016 | Wang | G02B 6/3825 | 385/56 |
| 2016/0049782 A1* | 2/2016 | Strasser | G02B 6/4471 | 174/72 A |
| 2016/0204591 A1* | 7/2016 | Vanhentenrijk | G02B 6/4444 | 277/606 |

* cited by examiner

FIBER BLOCKING KITS

This application claims priority to U.S. Provisional Application No. 62/173,800, filed on Jun. 10, 2015, and entitled "Fiber Blocking Kits," of which is incorporated herein by reference.

BACKGROUND

A necessary transition of outside fiber optic cable to inside plant communication equipment occurs at central data communication facilities. These outside fiber optic cables contain a moisture blocking gel that protects the optical fiber from moisture that will advance out of a terminated end of the outside fiber optic cable if the moisture blocking gel is not blocked.

For data communication manufacturers, making the transition from the outside fiber optic cable to the inside plant communication equipment can be a challenging process in which engineers develop transitioning apparatus to meet the high density needs of the central data communication locations while protecting the optical fibers, maintaining bend radii of the optical fibers, and managing massive amounts of the optical fibers. This is particularly true for optical fiber communication lines, where the engineers create fiber blocking kits that prevent the moisture blocking gel contained in outside plant cables from advancing out of a terminated end of the outside plant cable, and provide for splitting the optical fibers contained in the outside plant cables down to manageable sub-units based on communication equipment arranged in a central data communication facility.

Fiber blocking kits exist that are arranged to be filled with a sealant (e.g., Room Temperature Vulcanization (RTV) silicone) to prevent the moisture blocking gel contained in the outside plant cables from advancing out of the terminated end of the outside plant cable, but the fiber blocking kits are difficult to install, and often produce damaged fibers (e.g., micro-fractured fibers). For example, in the case where RTV silicone is used to prevent the moisture blocking gel from advancing out of the terminated end of the outside plant cable, micro-fractures may be produced in the fibers at an interface between the cured RTV silicone and a retainer plate due to a displacement of the outside plant cable and/or the fiber blocking kit. Thus, a user must take great care to ensure little or no displacement of the outside plant cable and/or the fiber blocking kit occurs in order to prevent micro-fracturing fibers at the interface of the cured RTV silicone and the retainer plate.

Moreover, because the fiber blocking kits are filled with RTV silicone to prevent the moisture blocking gel from advancing out of the outside plant cable, visually inspecting for proper installation of the fiber blocking kits is not possible. For example, because the the RTV silicone surrounds the fibers routed in the fiber blocking kit, visually inspecting for proper routing and bend radii of the fibers cannot be accomplished. Thus, potentially resulting in a fiber blocking kit installed with damaged fibers, which requires reinstallation of the fiber blocking kit.

SUMMARY

Fiber blocking apparatuses are described which are configured to couple with an outside plant cable containing optical fibers and a gelatinous element protecting the optical fibers from moisture. The fiber blocking apparatuses block the gelatinous element from advancing out of an outside plant cable, and split the optical fibers contained in the outside plant cables down to manageable sub-units. Generally, the fiber blocking apparatuses include a damping unit that prevents damaging (e.g., micro-fracturing) optical fibers and blocks the gelatinous element from advancing. This summary is provided to introduce simplified concepts of fiber blocking apparatuses, which are further described below in the Detailed Description. This summary is not intended to identify essential features of the claimed subject matter, nor is it intended for use in determining the scope of the claimed subject matter.

In some examples, a fiber blocking apparatus includes at least one damping unit arranged in the fiber blocking apparatus. The at least one damping unit may include a plurality of openings arranged in the at least one damping unit to collectively receive a portion of optical fibers contained in a cable. In some examples, the damping unit may dampen a displacement of the portion of the optical fibers collectively received by the plurality of openings arranged in the damping unit to prevent damaging the portion of the optical fibers. In some examples, the damping unit may block the gelatinous element from advancing beyond the at least one damping unit.

In other examples, a fiber blocking apparatus includes a view port providing visibility of a routing of the optical fibers in the fiber blocking apparatus. The view port may be a polished portion of a translucent material forming at least a portion of the fiber blocking apparatus. Further, the view port may be a convex lens magnifying the routing of the optical fibers.

In another example, a fiber blocking apparatus includes a plate arranged proximate to a coupling member of the fiber blocking apparatus. The plate may receive a portion of a plurality of protective tubes and retain the portion of the plurality of protective tubes proximate to the coupling member. The protective tubes may collectively contain a portion of optical fibers extending a distance beyond a portion of a cable coupled to a coupling member of the fiber blocking apparatus. In some examples, a damping unit may be arranged proximate to the plate. The damping unit may include a plurality of openings to collectively receive the optical fibers and dampen a displacement of the optical fibers to prevent damaging the optical fibers. Further, the damping unit may block a gelatinous element contained in the cable from advancing beyond the damping unit.

In another example, a method for installing a fiber blocking apparatus may include coupling a portion of a cable with a coupling member attached to a structural member of the fiber blocking apparatus, and arranging a damping unit proximate to a plate arranged proximate to the coupling member. The damping unit arranged proximate to the plate may dampen a displacement of a portion of optical fibers received in a plurality of openings arranged in the damping unit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
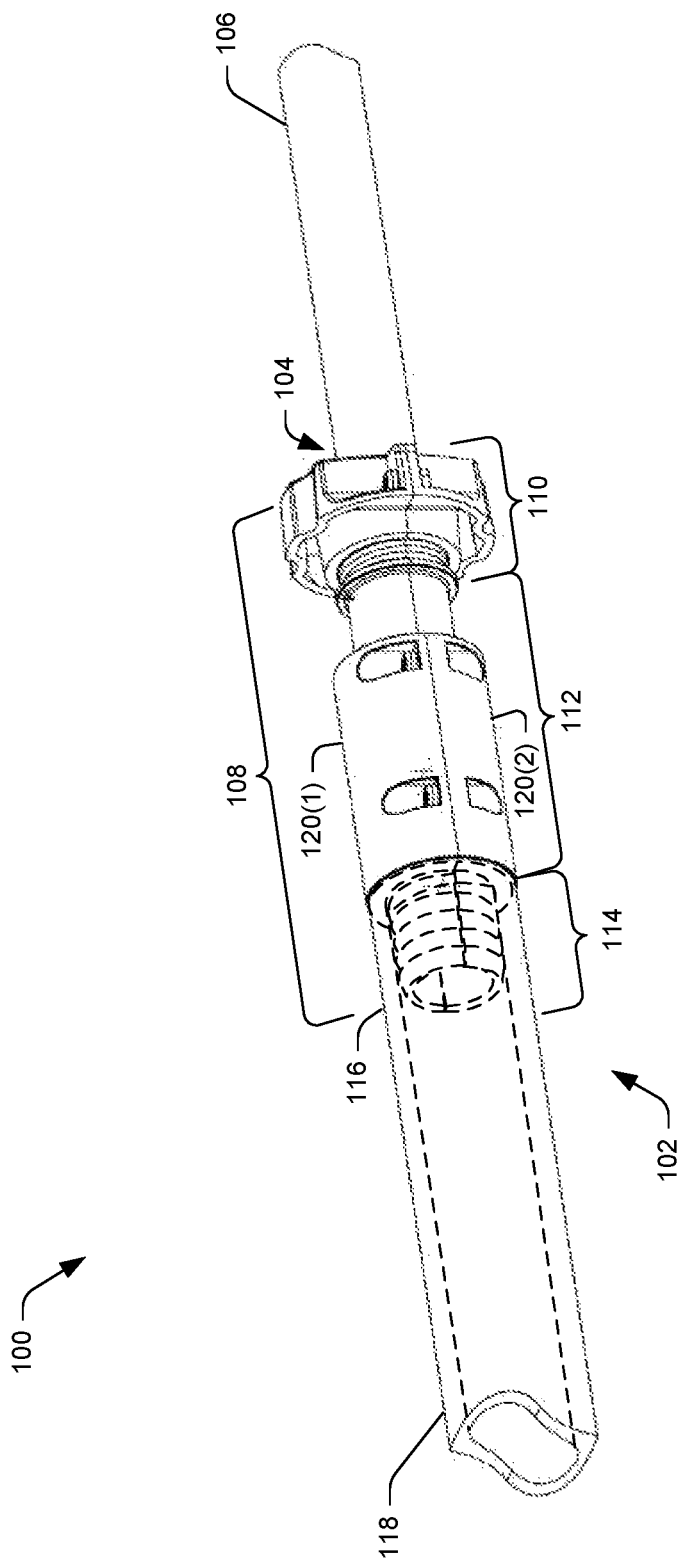
FIG. 1 illustrates an assembled view of an example fiber blocking apparatus for coupling with at least a portion of a cable.

This disclosure is directed to fiber blocking apparatuses, and methods of installing fiber blocking apparatuses. For example, fiber blocking apparatuses may include at least one damping unit to dampen a displacement of optical fibers collectively received by a plurality of openings arranged in the damping unit to prevent damaging (e.g., micro-fracturing) the portion of optical fibers collectively received by the plurality of openings. In other words, fiber blocking apparatuses may include at least one damping unit to prevent the optical fibers from bending beyond a maximum bending radius to prevent damaging the optical fibers. The at least one damping unit may also block a gelatinous element (e.g., a gel, a compound, a moisture blocking compound, a powder, an absorbent powder, etc.) from advancing beyond the at least one damping unit. For example, the fiber blocking apparatuses may be void of a sealant (e.g., room temperature vulcanization (RTV) silicone) used for blocking a gelatinous element contained in a cable (e.g., outdoor fiber cable) for protecting optical fibers from moisture, and the at least one damping unit may block the gelatinous element from advancing beyond the at least one damping unit. Because the fiber blocking apparatus may include at least one damping unit the fiber blocking apparatus provides for a higher tolerance to being displaced than compared to a tolerance of fiber blocking kits not having at least one damping unit. Thus, the fiber blocking apparatuses having at least one damping unit are more robust than fiber blocking kits not having at least one damping unit, and provide for a user to install the fiber blocking apparatus without taking great care to ensure little or no displacement of the fiber blocking apparatus occurs.

In another example, a view port may be arranged in the fiber blocking apparatuses. The view port may provide for visually inspecting a routing of optical fibers in the fiber blocking apparatuses. For example, upon visually inspecting a routing of optical fibers in a blocking apparatus, a user may determine if sub-units (e.g., one sub-unit may include four, 12 fiber ribbons, six, 12 fiber ribbons, four, 24 fiber ribbons, six, 24 fiber ribbons, etc.) of the optical fibers are properly routed through the fiber blocking apparatus and/or the sub-units of optical fibers do not have bends beyond a maximum bending radius. In this way, a user (e.g., an installer, a technician, a manager, an information systems technician, etc.) may assure quality installations of the fiber blocking apparatus and/or troubleshoot data transfer performance associated with the fiber blocking apparatus. For example, because the fiber blocking apparatus has a view port, the user may inspect an installed fiber blocking apparatus to determine if any of the internally routed optical fibers have been damaged and are causing insertion loss or loss in light transfer. Thus, a user may install fiber blocking apparatuses with a higher level of quality than fiber blocking kits not having a view port to inspect internally routed optical fibers.

Illustrative Fiber Blocking Apparatus

FIG. 1 illustrates an assembled view 100 of an example fiber blocking apparatus 102 for coupling with at least a portion 104 of a cable 106. For example, the fiber blocking apparatus 102 may include a body 108 having a coupling member 110 attached to a structural member 112, and the coupling member 110 may couple with the portion 104 of the cable 106. The cable 106 may be an outside cable (e.g., an outdoor cable capable of direct buried or aerial applications) containing optical fibers (not shown) and a gelatinous element (not shown) protecting the optical fibers from moisture. For example, the cable 106 may be buried underground outside a facility (e.g., a communications facility, a central communications location, central data communication location, a telecommunications facility, etc.) and pass through to an inside (e.g., a room, a frame room, a server room, a high density frame room, an ultra-high density frame room, etc.) of the facility where the cable 106 might be terminated.

The fiber blocking apparatus 102 may include another coupling member 114 (illustrated in FIG. 1 in dashed lines) attached to the structural member 112 opposite to the coupling member 110. The other coupling member 114 may couple with at least a portion 116 of a tube 118. The tube 118 may contain a portion of the optical fibers contained by the cable 106. For example, the tube 118 may receive a portion of the optical fibers extending a distance beyond a termination end the cable 106 and help limit a bend radius of the optical fibers contained in the tube 118. The tube 118 may be more flexible (e.g., deformable) than the cable 106. For example the tube 118 may be formed of a pliable Polyvinyl chloride (PVC), Polycarbonate (PC), Polyurethane (PUR), etc., while the cable 106 may be a rigid assembly of a rigid outer cable jacket, central tube gel-filled with moisture blocking compound, and a matrix of fibers arranged in the central tube.

FIG. 1 illustrates the body 108 of the fiber blocking apparatus may include a first portion 120(1) opposite a second portion 120(2). The first portion 120(1) may be fastened to the second portion 120(2) and arranged in-line with the cable 106 and/or the tube 118.

In one example, the fiber blocking apparatus 102 may have a capacity to receive at least 900 fibers (e.g., ribbon fiber, optical fiber, optical ribbon fiber, etc.). In another example, the fiber blocking apparatus 102 may have a capacity to receive at least 864 fibers. In another example, the fiber blocking apparatus 102 may have a capacity to receive at least 500 fibers. In another example, the fiber blocking apparatus 102 may have a capacity to receive at least 144 fibers.

Figure 2:
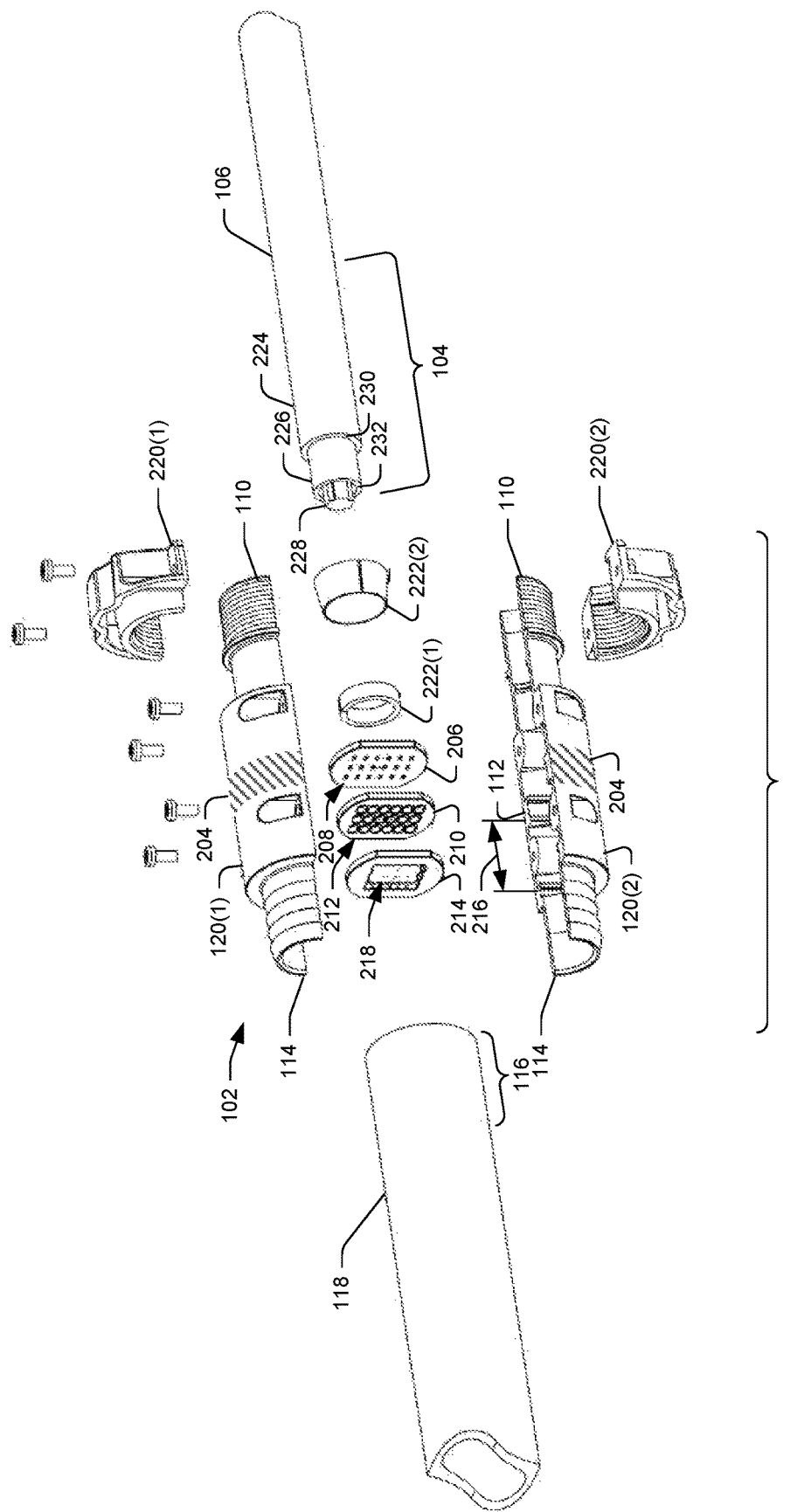
FIG. 2 illustrates an exploded view of the example fiber blocking apparatus shown in FIG. 1.

FIG. 2 illustrates an exploded view 202 of the example fiber blocking apparatus 102 for coupling with the portion 104 of the cable 106 shown in FIG. 1. The exploded view 202 shows the first portion 120(1) of the body 108 separated from the second portion 120(2) of the body 108.

The first portion 120(1) and/or the second portion 120(2) may be formed of a single unit of translucent material. Stated otherwise, the first portion 120(1) and/or the second portion 120(2) may be unitary components formed of a translucent material. For example, the first portion 120(1) and/or the second portion 120(2) may each be formed of a single unit of polymethyl methacrylate PMMA, polypropylene (PP), acrylonitrile butadiene styrene (ABS), glass, or the like, suitable for being assembled together and coupled with a cable and/or a tube. In this example, where the first portion 120(1) and/or the second portion 120(2) may be formed of a single unit of translucent material, the first portion 120(1) and/or the second portion 120(2) may include a view port 204. For example, the view port 204 may comprise a polished (e.g., flame polished, chemically polished, abrasively polished, etc.) portion of the translucent material. In another example, at least a portion of the view port 204 may be a convex lens formed (e.g., cast, molded, machined, etc.) in the single unit of translucent material. In another example, all of the single unit of translucent material forming the first and second portions 120(1) and 120(2) may be the view port 204.

While the first portion 120(1) and/or the second portion 120(2) are illustrated as being formed of a single unit of translucent material, the first portion 120(1) and/or the second portion 120(2) may not be formed of a single unit of translucent material. For example, the first portion 120(1) and/or the second portion 120(2) may be formed of multiple units of different types of materials (e.g., metal, plastic, glass, wood, composite, etc.). For example, the first portion 120(1) and/or the second portion 120(2) may have a base unit formed of metal, and the base unit may have the view port 204 arranged in the base unit formed of a translucent material (e.g., polymethyl methacrylate PMMA, polypropylene (PP), acrylonitrile butadiene styrene (ABS), glass, or the like).

The exploded view 202 illustrates at least one damping unit 206 arrangeable in the structural member 112. For example the at least one damping unit 206 may be arranged vertically in the structural member 112 proximate to the coupling member 110 and sandwiched between the first and second portions 120(1) and 120(2) of the body 108. The at least one damping unit 206 may comprise a plurality of openings 208 arranged in the at least one damping unit 206. For example, the at least one damping unit 206 may comprise a matrix (e.g., rows and columns, circular rings, intersecting paths, etc.) of apertures (e.g., slits, perforations, gaps, voids, etc.) arranged in the at least one damping unit 206. The matrix of the plurality of openings 208 may be based at least in part on a quantity of fiber (e.g., quantity of sub-units of fiber) contained by the cable 106, a quantity of protective tubes (e.g., furcation tubes) to collectively receive the fiber contained in the cable 106, a type and/or a quantity of communication equipment (e.g., frames) arranged in a central data communication facility that the fiber contained in the cable 106 is to be routed to, etc. The size of each of the plurality of openings 208 may be based at least in part on a size of sub-units of the optical fibers. For example, each of the plurality of openings 208 may have a size of about a four, 12 fiber ribbons sub-unit, a size of about a six, 12 fiber ribbons sub-unit, a size of about a four, 24 fiber ribbons sub-unit, a size of about a six, 24 fiber ribbons sub-unit, etc. And, each of the plurality of openings 208 may have a size that applies a force on the sub-units of optical fiber to retain the sub-units of fiber in the at least one damping unit 206. Moreover, each of the plurality of openings 208 may provide for slideably feeding each of the sub-units of the fiber ribbons through the plurality openings 208 to position the at least one damping unit 206 in the structural member 112.

FIG. 2 illustrates the at least one damping unit 206 may comprise a planar slab of flexible material. For example, the at least one damping unit 206 may comprise a planar slab of flexible silicone, thermoplastic elastomer (TPE), rubber, or polyethylene. Further, the flexible material forming the planar slab may be translucent to provide for a user to visually inspect the optical fibers received by the plurality of openings 208 arranged in the at least one damping unit 206.

The exploded view 202 illustrates a plate 210 arrangeable in the structural member 112. For example, the plate 210 may be arranged vertically in the structural member 112 proximate to the damping unit 206 and proximate to the coupling member 110. In another example, the plate 210 may be arranged vertically in the structural member 112 and directly adjacent to the damping unit 206. In another example, the plate 210 may be arranged vertically in the structural member 112 and arranged a distance from the damping unit 206. In the example where the plate 210 is arranged a distance from the damping unit 206, the distance between the plate 210 and the damping unit 206 may create a space that provides for slack management. For example, the damping unit 206 may receive sub-units of optical fibers from the cable 106 and the plate 210 may receive each of the sub-units of optical fiber via respective protective tubes (discussed in more detail below with regard to FIG. 3) arranged in the plate 210, and the space between the damping unit 206 and the plate 210 may provide for managing (e.g., adjusting) differences of respective lengths of each optical fiber ribbon within each of the sub-units of optical fiber arranged between the damping unit 206 and the cable 106. For example, because a length of at least about 3 feet (1 meter) to at most about 20 feet (6 meters) of the optical fibers from the cable 106 may be arranged (e.g., wound, wrapped, coiled, etc.) around a portion (e.g., a tray, a splice tray, a patch tray, a cabinet, a spool, etc.) of one or more communication equipment (e.g., frames) a difference in lengths between ribbons within the same protective tube (e.g., furcation tube) occurs. For example, when a length of slack of at least about 3 feet (1 meter) to at most about 20 feet (6 meters) of furcation tube is wound around a splice tray a difference in individual lengths between respective ribbons contained in the furcation tube occurs. This is because of the differences in individual radius seen by ribbons arranged on inside radiuses versus ribbons arranged on an outside radiuses which accumulates and creates up to at least about 0.5 inches (1 centimeter) to at most about 4 inches (10 centimeters) in slack in the inner most ribbons. The space between the damping unit 206 and the plate 210 may provide for managing (e.g., adjusting) the slack of the respective lengths of each ribbon within each of the sub-units of optical fiber arranged between the damping unit 206 and the cable 106. Stated otherwise, differences in lengths between ribbons within a furcation tube may occur when the furcation tube is wound around a splice tray and differences in radiuses seen by the inside ribbon versus the outside ribbon accumulates and creates up to at least about 0.5 inches (1 centimeter) to at most about 4 inches (10 centimeters) in slack in the inner most fiber that is managed via the space between the damping unit 206 and the plate 210.

The plate 210 may be sandwiched between the first and second portions 120(1) and 120(2) of the body 108. The plate 210 may comprise a plurality of openings 212 arranged in the plate 210. For example, the plate 210 may comprise a similar matrix as the matrix in the at least one damping unit 206. For example, the plurality of openings 212 arranged in the plate 210 may include a matrix (e.g., rows and columns, circular rings, intersecting paths) of apertures (e.g., perforations, gaps, voids, etc.) arranged in the plate 210. The matrix of the plurality of openings 212 may be based at least in part on a quantity of fiber (e.g., quantity of sub-units of fiber) contained by the cable 106, a quantity of protective tubes (e.g., furcation tubes) to collectively receive the fiber contained in the cable 106, a type and/or a quantity of communication equipment (e.g., frames) arranged in a central data communication facility that the fiber contained in the cable 106 is to be routed to, etc. The size of each of the plurality of openings 212 may be based at least in part on a size of each protective tube (e.g., each furcation tube) arranged to contain a sub-unit of the optical fiber (e.g., a four, 12 fiber ribbons sub-unit, a six, 12 fiber ribbons sub-unit, a four, 24 fiber ribbons sub-unit, a six, 24 fiber ribbons sub-unit, etc.). And, each of the plurality of openings 212 may have a size that provides for slideably feeding each protective tube through the plurality openings 212 to position the plate 210 in the structural member 112.

The plate 210 may comprise a planar slab of rigid material. For example, the plate 210 may comprise a planar slab of rigid polymethyl methacrylate PMMA, polypropylene (PP), acrylonitrile butadiene styrene (ABS), or the like. Further, the rigid material forming the plate 210 may be translucent to provide for a user to visually inspect the optical fibers and/or the protective tubes (e.g., furcation tubes) received by the plurality of openings 212 arranged in the plate 210.

The exploded view 202 illustrates a plate 214 arrangeable in the structural member 112. For example the plate 214 may be arranged vertically in the structural member 112, and arranged a distance 216 from the plate 210 in the structural member 112. The plate 214 may be sandwiched between the first and second portions 120(1) and 120(2) of the body 108. The plate 214 may comprise an opening 218 arranged in the plate 214. While the exploded view 202 illustrates the plate 214 having one large opening 218, the plate 214 may comprise a plurality of openings arranged in the plate 214. For example, the plate 214 may comprise a plurality of openings similar to the openings 212 arranged in the plate 210. The opening 218 may have a size based at least in part on a quantity of fiber (e.g., quantity of sub-units of fiber) contained by the cable 106, a quantity of protective tubes (e.g., furcation tubes) to collectively receive the fiber contained in the cable 106, a type and/or a quantity of communication equipment (e.g., frames) arranged in a central data communication facility that the fiber contained in the cable 106 is to be routed to, etc.

The exploded view 202 of the example fiber blocking apparatus 102 shows the coupling member 110 couplable with the portion 104 of the cable 106 via an openable nut 220(1) and 220(2), and compression fitting washers 222(1) and 222(2). The openable nut 220(1) and 220(2) and the compression fitting washers 222(1) and 222(2) may be arranged to be hand operable. For example, a user may hand tighten the openable nut 220(1) and 220(2) to compress the compression fitting washers 222(1) and 222(2) on the portion 104 of the cable 106 in the coupling member 110, and to couple the portion 104 of the cable 106 to the fiber blocking apparatus 102. While the exploded view 202 illustrates a openable nut 220(1) and 220(2) and compression fitting washers 222(1) and 222(2) arranged to couple the portion 104 of the cable 106 to the fiber blocking apparatus 102, the portion 104 of the cable 106 may be coupled to the fiber blocking apparatus 102 via other coupling mechanisms. For example the fiber blocking apparatus 102 may include a clamping mechanism, slip joint mechanism, a cable tie mechanism, etc. to couple the fiber blocking apparatus 102 to the portion 104 of the cable 106.

The exploded view 202 of the example fiber blocking apparatus 102 shows the coupling member 114 may comprise a barb fitting arranged to couple with the portion 116 of the tube 118. While the exploded view 202 illustrates the coupling member 114 comprising a barb fitting arranged to couple with the portion 116 of the tube 118, the portion 116 of the tube 118 may be coupled to the fiber blocking apparatus 102 via other coupling mechanisms. For example the fiber blocking apparatus 102 may include a clamping mechanism, slip joint mechanism, a cable tie mechanism, etc. to couple the fiber blocking apparatus 102 to the portion 116 of the tube 118.

FIG. 2 illustrates the cable 106 may include an outer jacket 224 covering one or more sub-unit jackets 226 covering a plurality of optical fibers 228. The outer jacket 224 and the one or more sub-unit jackets 226 may have termination ends 230 and 232 where the outer jacket 224 and the one or more sub-unit jackets 226 have been stripped (e.g., removed) from the cable 106 to expose the plurality of optical fibers 228. A portion of the optical fibers 228 contained by the cable 106 may extend a distance beyond the portion 104 of the cable 106 coupled to the coupling member 110. For example, a length of the plurality of optical fibers 228 extending beyond the termination ends 230 or 232 may be determined by equipment specifications. In another example, a length of the plurality of optical fibers 228 extending beyond the termination ends 230 or 232 may be a maximum length of about 16 feet (5 meters).

Figure 3:
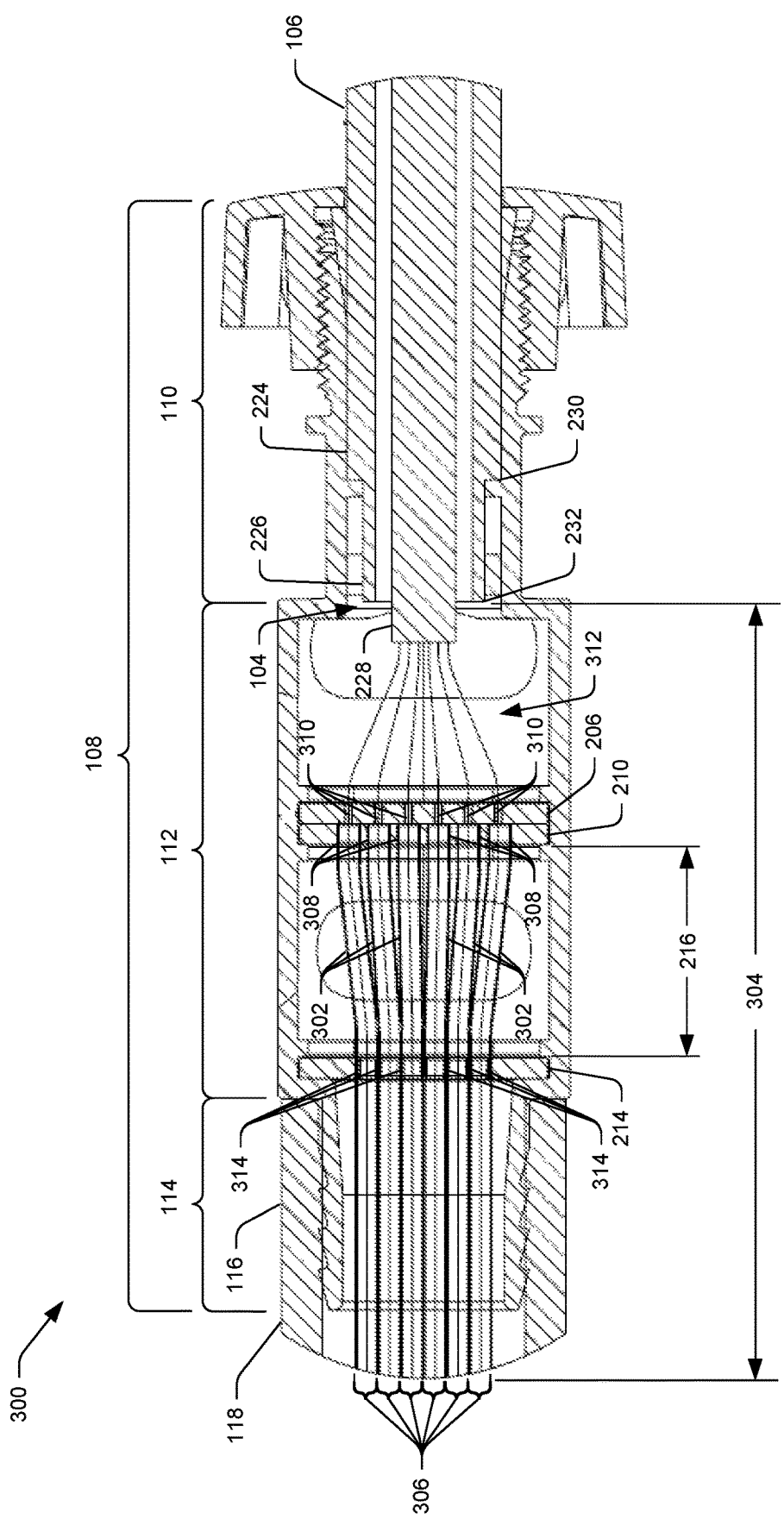
FIG. 3 illustrates a section view of the example fiber blocking apparatus shown in FIG. 1.

FIG. 3 illustrates a section view 300 of the fiber blocking apparatus 102 illustrated in FIG. 1. The section view 300 illustrates the body 108 having the coupling member 110 attached to the structural member 112 and the other coupling member 114 attached to the structural member 112 opposite to the coupling member 110. The coupling member 110 may be coupled with the portion 104 of the cable 106 and the other coupling member 114 may be coupled with the portion 116 of the tube 118.

The section view 300 illustrates the cable 106 containing the optical fibers 228. A portion 302 of the optical fibers 228 contained by the cable 106 may extend a distance 304 beyond the portion 104 of the cable 106 coupled to the coupling member 110. A plurality of protective tubes 306 may collectively contain the portion 302 of the optical fibers 228 extending the distance 304 beyond the portion 104 of the cable 106 coupled to the coupling member 110. For example, each of a plurality of furcation tubes may be slideably fed over a sub-unit of the optical fibers 228 to collectively contain the portion 302 of the optical fibers 228.

The section view 300 illustrates the plate 210 arranged proximate to the coupling member 110. The plate 210 may receive a portion 308 of the plurality of protective tubes 306 and retain the portion 308 of the plurality of protective tubes 306 proximate to the coupling member 110. For example, an end of a protective tube 306 may be fixed in a respective opening of the plurality of openings 212 arranged in the plate 210. Each portion 308 of the protective tube 306 may be fixed to a respective opening of the plurality of openings 212 via an adhesive (e.g., a quick-setting adhesive, based on cyanoacrylates or similar polymers).

The section view 300 illustrates the at least one damping unit 206 arranged proximate to the plate 210 and the plurality of openings 208 collectively receiving a portion 310 of the optical fibers 228 extending the distance 304 beyond the portion 104 of the cable 106 coupled to the coupling member 110. The at least one damping unit 206 dampens a displacement of the portion 310 of the optical fibers 228 collectively received by the plurality of openings 208 to prevent damaging the portion 310 of the optical fibers 228. In one example, the displacement of the portion 310 of the optical fibers 228 may be caused by a displacement of the tube 306. For example, during installation or maintenance a user may displace (e.g., move, adjust, manipulate, handle, etc.) the tube 306 a distance, causing the plurality of protective tubes 306 containing the portion 302 of the optical fibers 228 to be displaced. And, the displacement of the optical fibers 228 causing the displacement of the portion 310 of the optical fibers 228 arranged in the plurality of openings 208 of the damping unit 206.

In one example, a cavity 312 arranged in the structural member 112 may be filled with a sealant (e.g., room temperature vulcanization (RTV) silicone) (not shown) used for blocking the gelatinous element from advancing beyond the portion 104 of the cable 106 coupled with the coupling member 110. In this example, where the cavity 312 is filled with a sealant, the damping unit 206 may dampen a displacement of the portion 310 of the optical fibers 228 collectively received by the plurality of openings 208 and prevents the optical fibers 228 from bending beyond a maximum bending radius at the exterior surface of the sealant. Stated otherwise, the damping unit 206 dampens a displacement of the optical fibers 228 about an exterior surface of the cured sealant. And, the dampened displacement of the optical fibers about the exterior surface of the cured sealant prevents the optical fibers from bending beyond a maximum bending radius about the exterior surface of the cured sealant. Preventing the optical fibers from bending beyond a maximum bending radius prevents damaging (e.g., fracturing) the optical fibers at the exterior surface of the cured sealant.

In another example, the cavity 312 arranged in the structural member 112 may not be filled with the sealant used for blocking the gelatinous element from advancing beyond the portion 104 of the cable 106 coupled with the coupling member 110. In this example, where the cavity 312 is void of the sealant, the damping unit 206 may block the gelatinous element contained in the cable 106 from advancing beyond the at least one damping unit 206. For example, the damping unit 206 may be a barrier that prevents the gelatinous element from advancing beyond the damping unit 206 and/or prevents the gelatinous element from exiting the portion 104 of the cable 106. Further, in the example where the cavity 312 is void of the sealant, the damping unit 206 may dampen a displacement of the portion 310 of the optical fibers 228 collectively received by the plurality of openings 208 of the damping unit 206 to prevent damaging the portion 310 of the optical fibers. For example, because the plate 210 retains the portion 308 of the plurality of protective tubes 306 containing the optical fibers 228, the optical fibers 228 may be displaced about the plate 210 when the plurality of protective tubes 306 are displaced, and the damping unit 206 may dampen the displacement of the optical fibers 228 about the plate 210. Because the damping unit 206 dampens the displacement of the optical fibers, the damping unit 206 prevents the optical fibers from bending beyond a maximum bending radius about the plate 210. Preventing the optical fibers from bending beyond a maximum bending radius prevents damaging (e.g., fracturing) the optical fibers at the plate 210.

The section view 300 illustrates the other plate 214 arranged the distance 216 from the plate 210 and receiving another portion 314 of the plurality of protective tubes 306. The plate 214 may retain the portion 314 of the plurality of protective tubes 306 at the distance 216 from the plate 210. In some examples, the opening 218 arranged in the plate 214 may retain the portion 314 of the plurality of protective tubes 306 at the distance 216 from the plate 210. In other examples, a plurality of openings arranged in the plate 214 may retain the other portion 314 of the plurality of protective tubes 306 at the distance 216 from the plate 210. Because the plate 210 and the other plate 214 both retain the protective tubes 306 in the body 108 of the fiber blocking apparatus 102, the protective tubes 306 are constrained at least at these two locations in the body 108. Because the protective tubes 306 are constrained at least at these two locations in the body 108, the protective tubes 306 are prevented from being displaced between these two locations in the body 108. Preventing the protective tubes 306 from being displaced between these two locations prevents the optical fibers from bending beyond a maximum bending radius and prevents damaging (e.g., fracturing) the optical fibers at the plate 210.

Illustrative Fiber Blocking Apparatus Installation

Figure 4:
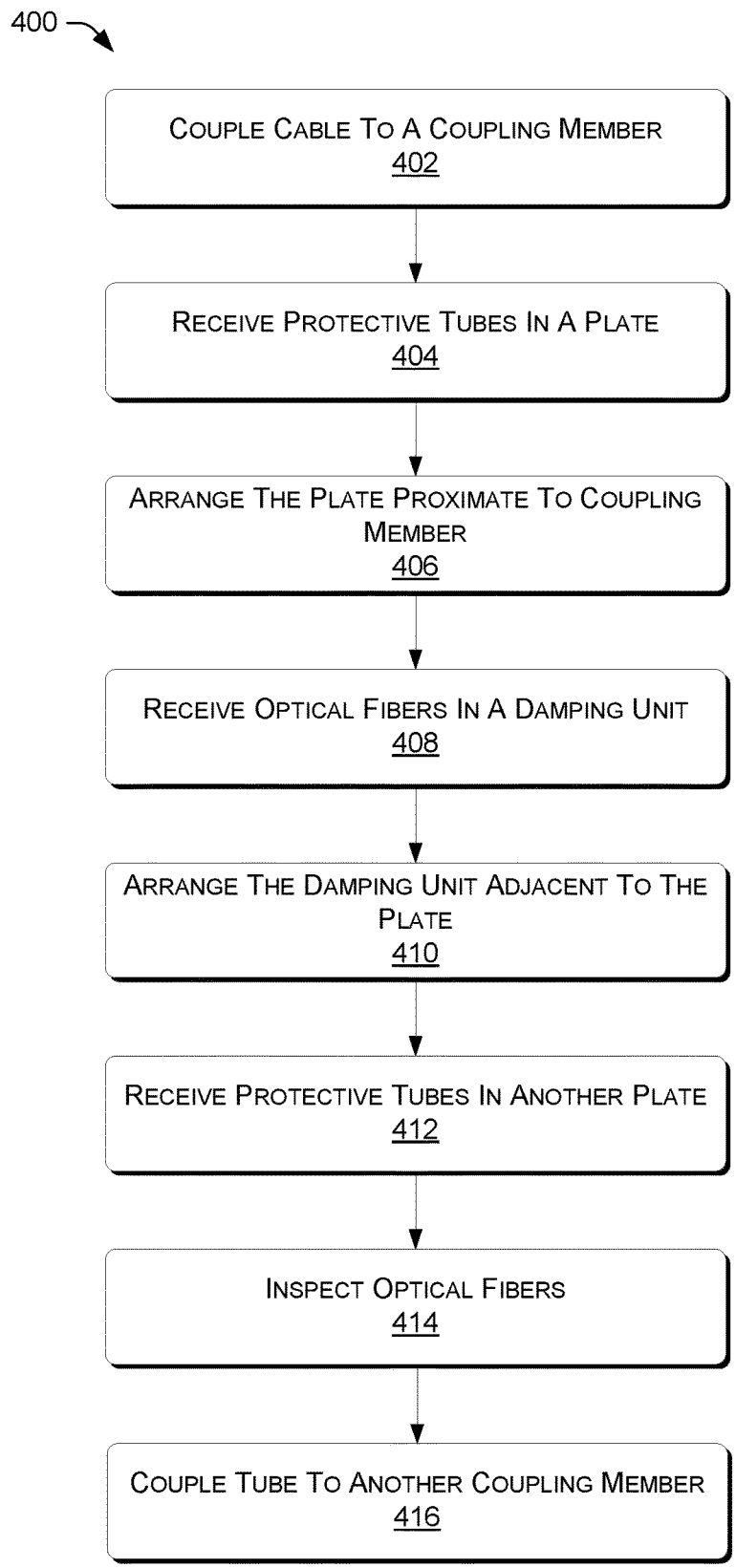
FIG. 4 is a flow diagram illustrating an example process of installing the example fiber blocking apparatus shown in FIG. 1.

FIG. 4 is a flow diagram illustrating an example process 400 of installing a fiber blocking apparatus (e.g., fiber blocking apparatus 102) at a facility (e.g., a communications facility, a central communications location, central data communication location, a telecommunications facility, etc.). For example, a user (e.g., an installer, a technician, a manager, an information systems technician, etc.) may install a fiber blocking apparatus to transition from an outside cable to an inside location (e.g., communication equipment).

Process 400 may include coupling, at operation 402, a portion (e.g., portion 104) of a cable (e.g., cable 106) with a coupling member (e.g., coupling member 110) attached to a structural member (e.g., structural member 112). The cable may be an outside cable containing optical fibers (e.g., optical fibers 228) and a gelatinous element protecting the optical fibers from moisture.

Process 400 may include receiving, at operation 404, a first portion (e.g., portion 308) of a plurality of protective tubes (e.g., protective tubes 306) in a plate (e.g., plate 210). For example, a user may slideably feed the plate along the protective tubes to position the plate proximate to an end of the protective tubes. The protective tubes may contain a first portion (e.g., portion 302) of the optical fiber and the optical fiber may exit the end of the protective tubes.

Process 400 may include arranging, at operation 406, the plate proximate to the coupling member to retain the first portion of the protective tubes proximate to the coupling member. For example, a user may arrange the plate vertically in the structural member to be sandwiched between first and second portions (e.g., first and second portions 120(1) and 120(2)) of the fiber blocking apparatus. Operation 406 may include fixing each of the first portions of the protective tubes to a respective opening of a plurality of openings (e.g., openings 212) of the plate via an adhesive.

Process 400 may include operation 408, which represents receiving a second portion (e.g., portion 310) of the optical fibers in a plurality of openings (e.g., openings 208) arranged in at least one damping unit (e.g., damping unit 206). For example, a user may slideably feed the damping unit along the optical fibers to position the damping unit proximate to the coupling member.

Process 400 may include operation 410, which represents arranging the damping unit proximate to the plate to dampen a displacement of the second portion of the optical fibers to prevent damaging the second portion of the optical fibers.

Process 400 may include receiving, at operation 412, a second portion (e.g., portion 314) of the plurality of protective tubes in another plate (e.g., plate 214). For example, a user may slideably feed the other plate along the protective tubes to a position proximate to the plate. Operation 412 may include arranging the other plate a distance (e.g., distance 216) from the plate to retain the second portion of the plurality of protective tubes at the distance from the plate.

Process 400 may continue with operation 414, which represents visually inspecting a routing of the optical fibers collectively received by the plurality of openings arranged in the damping unit via a view port (e.g., view port 204) arranged in the structural member. For example, a user may visually look through the view port to inspect an assembled fiber blocking apparatus and determine if any of the internally routed optical fibers have been damaged.

Process 400 may end at operation 416, which represents coupling a portion (e.g., portion 116) of a tube (e.g., tube 118) with another coupling member (e.g., coupling member 114) attached to the structural member opposite to the coupling member. Operation 416 may include containing the protective tubes in the tube. For example, a user may slideably feed the tube along the protective tubes to contain the protective tubes and couple an end of the tube to the other coupling member.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. An apparatus comprising:
   a body having a coupling member attached to a structural member,
      the coupling member coupling with at least a portion of a cable, the cable containing optical fibers and a gelatinous element protecting the optical fibers from moisture;
   a first plate arranged proximate to the coupling member, the first plate including a first plurality of openings arranged in the first plate, the first plurality of openings to collectively receive a first portion of a plurality of protective tubes and retain the first portion of the plurality of protective tubes proximate to the coupling member;
   a second plate arranged a distance from the first plate, the second plate including at least one of:
      a second plurality of openings arranged in the second plate, the second plurality of openings collectively receiving a second portion of the plurality of protective tubes and retaining the second portion of the plurality of protective tubes at the distance from the first plate, or
      an opening arranged in the second plate, the opening receiving the second portion of the plurality of protective tubes and retaining the second portion of the plurality of protective tubes at the distance from the first plate; and
   at least one damping unit arranged proximate to the first plate, the at least one damping unit including a third plurality of openings arranged in the at least one damping unit collectively receiving a portion of the optical fibers contained in the cable, a size of each opening of the third plurality of openings arranged in the at least one damping unit based at least in part on a size of a sub-unit of the portion of the optical fibers, and the at least one damping unit configured to perform at least one of:
      dampening a displacement of the portion of the optical fibers collectively received by the third plurality of openings to prevent damaging the portion of the optical fibers collectively received by the third plurality of openings, or
      blocking the gelatinous element from advancing beyond the at least one damping unit.

2. The apparatus of claim 1, further comprising a view port arranged in the structural member providing visibility of a routing of the optical fibers collectively received by the third plurality of openings of the at least one damping unit.

3. The apparatus of claim 2, wherein the structural member and the view port are formed as a unitary component of translucent material.

4. The apparatus of claim 3, wherein the view port comprises a polished portion of the translucent material.

5. The apparatus of claim 3, wherein the translucent material comprises a polymethyl methacrylate PMMA.

6. The apparatus of claim 2, wherein at least a portion of the view port comprises a convex lens magnifying the routing of the optical fibers.

7. The apparatus of claim 1, wherein the dampening unit comprises a planar slab of silicone, thermoplastic elastomer (TPE), rubber, or polyethylene.

8. The apparatus of claim 1, wherein the structural member is devoid of a sealant used for blocking the gelatinous element from advancing beyond the portion of the cable coupled with the coupling member.

9. The apparatus of claim 1, wherein the coupling member is a first coupling member, and
   wherein the apparatus further comprises a second coupling member attached to the structural member opposite to the first coupling member, the second coupling member coupling with at least a portion of a tube, the tube containing the portion of the optical fibers collectively received by the third plurality of openings arranged in the at least one damping unit.

10. An apparatus comprising:
    a body having a coupling member attached to a structural member,
       the coupling member coupling with at least a portion of a cable, the cable containing optical fibers and a gelatinous element protecting the optical fibers from moisture,
       a portion of the optical fibers contained by the cable extending a distance beyond the portion of the cable coupled to the coupling member,
    a plurality of protective tubes collectively containing the portion of the optical fibers extending the distance beyond the portion of the cable coupled to the coupling member,
    a first plate arranged proximate to the coupling member, the first plate including a first plurality of openings arranged in the first plate, the first plurality of openings collectively receiving a first portion of the plurality of protective tubes and retaining the first portion of the plurality of protective tubes proximate to the coupling member,
    a second plate arranged a distance from the first plate, the second plate including at least one of:
       a second plurality of openings arranged in the second plate, the second plurality of openings collectively receiving a second portion of the plurality of protective tubes and retaining the second portion of the plurality of protective tubes at the distance from the first plate, or an opening arranged in the second plate, the opening receiving the second portion of the plurality of protective tubes and retaining the second portion of the plurality of protective tubes at the distance from the first plate, and at least one damping unit arranged proximate to the first plate, the at least one damping unit including a third plurality of openings arranged in the at least one damping unit collectively receiving another portion of the optical fibers extending the distance beyond the portion of the cable coupled to the coupling member, a size of each opening of the third plurality of openings arranged in the at least one damping unit based at least in part on a size of a sub-unit of the other portion of the optical fibers, and the at least one damping unit configured to perform at least one of:

dampening a displacement of the other portion of the optical fibers collectively received by the third plurality of openings to prevent damaging the other portion of the optical fibers collectively received by the third plurality of openings, or blocking the gelatinous element from advancing beyond the at least one damping unit.

11. The apparatus of claim 10, wherein the first plate or the second plate comprises a planar slab of polymethyl methacrylate PMMA.

12. The apparatus of claim 10, wherein the dampening unit comprises a planar slab of silicone, thermoplastic elastomer (TPE), rubber, or polyethylene.

13. The apparatus of claim 10, wherein the coupling member is a first coupling member, and wherein the apparatus further comprises a second coupling member attached to the structural member opposite to the first coupling member, the second coupling member coupling with at least a portion of a tube, the tube containing the plurality of protective tubes collectively containing the portion of optical fibers.

14. A method comprising:

coupling a portion of a cable with a coupling member attached to a structural member, the cable containing optical fibers and a gelatinous element protecting the optical fibers from moisture;

collectively receiving a first portion of a plurality of protective tubes in a first plurality of openings arranged in a first plate, the protective tubes containing a first portion of the optical fibers;

arranging the first plate proximate to the coupling member such that the first plurality of openings arranged in the first plate retain the first portion of the protective tubes proximate to the coupling member;

receiving a second portion of the plurality of protective tubes in a second plate, the receiving of the second portion of the plurality of protective tubes including at least one of:

collectively receiving the second portion of the plurality of protective tubes in a second plurality of openings included in the second plate, or receiving the plurality of protective tubes in an opening included in the second plate;

wherein, when the second plate includes the second plurality of openings, the method further comprises arranging the second plate a distance from the first plate such that the second plurality of openings arranged in the second plate retain the second portion of the plurality of protective tubes at the distance from the first plate;

wherein, when the second plate includes the opening, the method further comprises arranging the second plate a distance from the first plate such that the opening in the second plate retains the second portion of the plurality of protective tubes at the distance from the first plate;

collectively receiving a second portion of the optical fibers in a third plurality of openings arranged in at least one damping unit, a size of each opening of the third plurality of openings arranged in the at least one damping unit based at least in part on a size of a sub-unit of the second portion of the optical fibers; and arranging the at least one damping unit proximate to the first plate to dampen a displacement of the second portion of the optical fibers to prevent damaging the second portion of the optical fibers.

15. The method of claim 14, further comprising:

visually inspecting a routing of the optical fibers collectively received by the third plurality of openings arranged in the damping unit via a view port arranged in the structural member.

16. The method of claim 14, further comprising:

coupling a portion of a tube with another coupling member attached to the structural member opposite to the coupling member; and containing the protective tubes containing the first portion of the optical fibers in the tube.

* * * * *